(12) United States Patent
Hu

(10) Patent No.: US 6,916,055 B2
(45) Date of Patent: Jul. 12, 2005

(54) LENS PRESS TOOL

(75) Inventor: Charles Hu, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 61 days.

(21) Appl. No.: 10/279,610

(22) Filed: Oct. 24, 2002

(65) Prior Publication Data

US 2004/0080170 A1 Apr. 29, 2004

(51) Int. Cl.[7] .............................................. B25J 15/12
(52) U.S. Cl. .................... 294/100; 294/103.1
(58) Field of Search ........................... 294/1.2, 2, 64.1, 294/103.1, 99.1, 100, 86.4; 29/466, 468; 901/39

(56) References Cited

U.S. PATENT DOCUMENTS

| | | | | |
|---|---|---|---|---|
| 4,093,291 A | * | 6/1978 | Schurgin | 294/1.2 |
| 4,257,639 A | * | 3/1981 | Stock | 294/82.26 |
| 4,950,011 A | * | 8/1990 | Borcea et al. | 294/2 |
| 5,251,117 A | | 10/1993 | Nagai | 362/311 |
| 5,280,389 A | | 1/1994 | Kunikane et al. | 359/664 |
| 5,317,939 A | * | 6/1994 | Marinescu | 81/53.11 |
| 5,333,224 A | | 7/1994 | Kikuchi | 385/93 |
| 5,572,785 A | * | 11/1996 | Tveit | 29/468 |
| 5,822,134 A | | 10/1998 | Yamamoto et al. | 359/718 |
| 5,858,163 A | | 1/1999 | Wood et al. | 156/350 |
| 6,051,091 A | | 4/2000 | Wood et al. | 156/103 |
| 6,106,665 A | | 8/2000 | Wood et al. | 156/379.6 |
| 6,147,817 A | | 11/2000 | Hashizume | 359/819 |
| 6,305,729 B1 | * | 10/2001 | Mukasa | 294/64.1 |
| 6,394,520 B1 | * | 5/2002 | Quick et al. | 294/64.1 |

FOREIGN PATENT DOCUMENTS

SU          1743853 A2  *  6/1992  ............... 294/100

* cited by examiner

Primary Examiner—Dean J. Kramer
(74) Attorney, Agent, or Firm—Workman Nydegger

(57) ABSTRACT

Embodiments provide for an optical component mounting apparatus and method. One embodiment provides a body defining a lens applicator tip at one end, wherein the lens applicator tip defines a lens contact surface. A lens retaining member includes a lens carrying tip defining a lens receiving opening and is slidably disposed over at least the lens applicator tip. The lens carrying tip is slidably positionable between a lens carrying position in which the lens carrying tip extends past the lens applicator tip, and a lens release position in which the lens carrying tip is retracted with respect to the lens applicator tip.

26 Claims, 8 Drawing Sheets

LENS PRESS TOOL

BACKGROUND OF THE INVENTION

1. Field of the Invention

The present invention generally relates to apparatus and methods for mounting optical components.

2. Description of the Related Art

The manufacturing processes involved in generating optical systems generally requires precise alignment of lenses, prisms, mirrors, isolators, and other optical components within various mounting apparatuses. Precise alignment is particularly important in laser-based optical systems, as misalignment may interfere with optical isolation, which may reduce or eliminate the optical gain needed for proper laser operation and may increase system noise. Additionally, with regard to polarization and filtration processes involving crystals, the crystals often require precise alignment in order to achieve minimum insertion loss and maximum polarization parameters. Although optical isolators often use magnets to align the photons for increased polarization efficiency with respect to the crystal lattice, if the magnets are not properly aligned relative the lattice, polarization may nonetheless still be negatively affected and the return loss decreased.

Therefore, in order to minimize component alignment problems, specialized optical mounting devices are frequently used to secure optical components therein. For example, a retainer ring, spring-type retainer, or other means for exerting a biasing/securing pressure generally operates to secure the optical component within the mounting device, thereby reducing the chance that the optical component will be moved out of alignment after the initial assembly process is complete. It is desirable to apply the biasing pressure in a single direction, i.e., the component is preferably biased against a fixed member in a unitary direction in order to prevent translational movement of the component. However, conventional configurations may still be subject to small perturbations in directions other than the biasing pressure direction, such as, for example, in a rotational direction or a direction orthogonal to the biasing direction. For example, many optical mounts (especially prism mounts) make use of a spring retainer, wherein the spring retainer contacts the top of the optical component urging it down against a base plate. In this configuration, the optical component is prevented from being translated in the direction of the biasing force, however, rotational movement and/or slipping of the lens horizontally is not restricted. Conversely, many optical isolator mounts secure their optical components at their perimeter, thereby preventing rotation, however, these mounting configurations may still be susceptible to translational movement or slippage. Another common optical component mounting technique is to clamp the optical component in place with a rod that urges the optical component against one or more base plates, where the rod is attached to a post with locking screws, and the rod in turn is securely attached to the base plates. However, the use of screws can be problematic, as they may loosen in time, particularly when they are exposed to the temperature cycling that often accompanies optical systems. Furthermore, the rod configuration generally offers only a unitary direction biasing/securing force, and therefore, it is again susceptible to rotational and horizontal translations.

Another common approach to mounting optical components is to use epoxy-based mounts. In these configurations, the optical component is placed in a mount and an epoxy is applied to the perimeter of the component. Once the epoxy cures, the component is generally affixed in the mount and is not susceptible to movement. However, although the use of epoxies is generally suitable for room temperature applications, epoxy mounts have shown weakness in environments where the temperature fluctuates, as epoxies and optical materials generally have different temperature coefficients of expansion. Thus, the epoxy may expand or contract at a different rate than the surrounding mount or the optical component itself, which can displace the optical component and potentially break the mounting bond.

Therefore, in view of the disadvantages of conventional optical mounting devices and methods, there is a need for a simple, easily manufactured, efficient, and cost effective optical component mounting apparatus that overcomes the disadvantages of conventional optical mounting devices.

SUMMARY OF THE INVENTION

Embodiments of the invention generally provide an apparatus and method for holding and mounting optical components, i.e., lenses.

One embodiment provides an apparatus for mounting optical components, comprising: a body defining a lens applicator tip at one end, wherein the lens applicator tip defines a lens contact surface; and a lens retaining member comprising a lens carrying tip defining a lens receiving opening and slidably disposed over at least the lens applicator tip; wherein the lens carrying tip is slidably positionable between a lens carrying position in which the lens carrying tip extends past the lens applicator tip, and a lens release position in which the lens carrying tip is retracted with respect to the lens applicator tip.

Another embodiment provides an apparatus for mounting optical components, comprising: a body defining a lens applicator tip at one end, wherein the lens applicator tip defines a lens contact surface; and a slidably disposed lens retaining member comprising a plurality of flexible fingers which define a lens carrying tip slidably disposed over at least the lens applicator tip; wherein the lens carrying tip is slidably positionable between a lens carrying position and a lens release position.

Yet another embodiment provides an apparatus for mounting optical components, comprising: a body defining a lens applicator tip at one end, wherein the lens applicator tip defines a lens contact surface; a slidably disposed lens retaining member comprising a plurality of flexible fingers which define a lens carrying tip slidably disposed over at least the lens applicator tip; wherein the lens carrying tip defines a lens mount contact surface at a distal end thereof and is slidably positionable between a lens carrying position and a lens release position; and at least one biasing member to bias the lens retaining member into the lens carrying position.

Still another embodiment provides a method of mounting a lens in a lens mount, comprising: disposing the lens against a lens contact surface of a lens applicator tip formed at a distal end of a body; retaining the lens against the lens contact surface with a slidable lens carrying member disposed about a perimeter of the lens; contacting a distal biasing surface of the slidable lens carrying member with an annular surface of the lens mount; and slidably retracting the slidable lens carrying member over the lens applicator tip, whereby the lens is released from the slidable lens carrying member while remaining in contact with the lens contact surface of the lens applicator tip.

BRIEF DESCRIPTION OF THE DRAWINGS

So that the manner in which the above recited features of the invention are attained can be understood in detail, a more particular description of the invention, briefly summarized above, may be had by reference to the embodiments thereof, which are illustrated in the appended drawings. It is to be noted, however, that the appended drawings illustrate only typical embodiments of this invention, and are therefore, not to be considered limiting of its scope, for the invention may admit to other equally effective embodiments.

DETAILED DESCRIPTION OF THE PREFERRED EMBODIMENT

Embodiments of the invention generally provide an optical component mounting apparatus.

Figure 1:
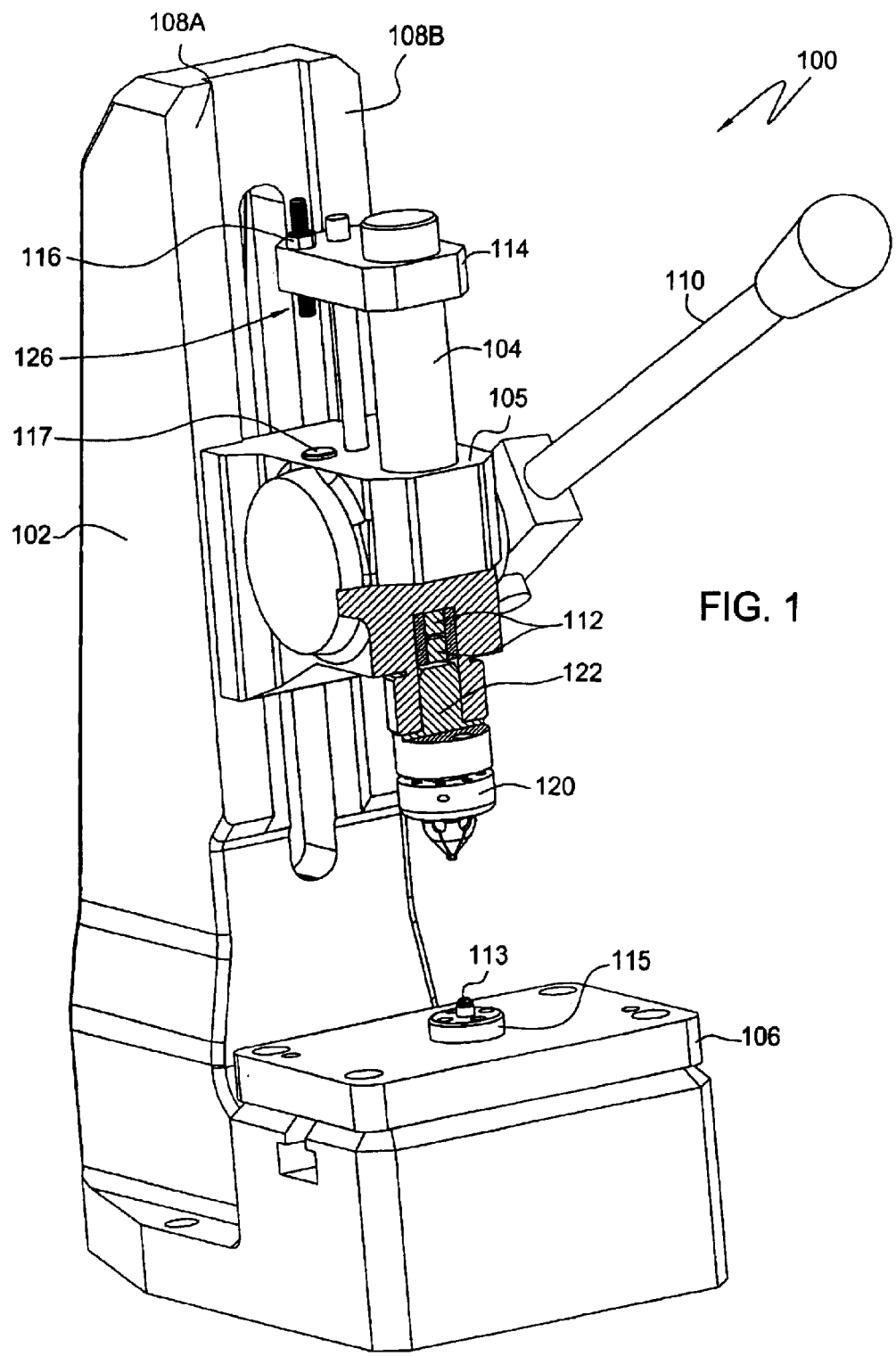
FIG. 1 is a perspective view of an exemplary tool for mounting optical components.

FIG. 1 shows one embodiment of a lever-action mounting tool 100. Generally, the lever-action mounting tool 100 comprises a body 102, a setting member carrier 104, a carrier guide 105 and a table 106. The body 102 defines a pair of glide surfaces 108A-B over which the carrier guide 105 slides bi-directionally. Accordingly, the carrier guide 105 may be moved to a desired height with respect to table 106 and then secured by a mounting mechanism (not shown). The carrier 104 is slidably disposed through the carrier guide 105 and is actuated by a lever 110, which may be rotated by a human operator. A lower end of the carrier 104 is adapted to receive and carry an optical component mounting assembly 120. Illustratively, the mounting assembly 120 is magnetically coupled to the carrier 104 by the provision of magnets 112 and a magnetic body 122 of the mounting assembly 120. Such an arrangement facilitates quick release of the mounting assembly 120. More generally, any means of securing the mounting assembly 120 in the carrier 104 may be used to advantage.

In operation, the lever 110 is pulled down to cause the carrier 104 to downwardly traverse through the carrier guide 105 and toward the table 106. In this manner, the optical component mounting assembly 120 is moved toward a lens mount 113 disposed on the table 106. More specifically, the lens mount 113 is disposed on a table-mounted jig 115, which facilitates aligning the lens mount 113 with the mounting assembly 120. The travel distance of the carrier 104 is preferably adjustable, to ensure a desired relative positioning of the mounting assembly 120 and the lens mount 113. Accordingly, the carrier 104 is equipped with a stop set screw 126 threadedly disposed through a cantilever mounted bracket 114, secured to the upper portion of the carrier 104. The stop set screw 126 may be rotated to a desired position, and then secured by a locknut 116. Downward travel of the carrier 104 continues until a lower end of the stop set screw 126 engages a landing 117 formed on an upper surface of the carrier guide 105, thereby defining the terminal position of the carrier 104.

Illustratively, the lever-action mounting tool 100 is a lever-actuated apparatus. More generally, the apparatus 100 may be any variety of machines or devices adapted to carry the optical component mounting assembly 120.

Figure 2:
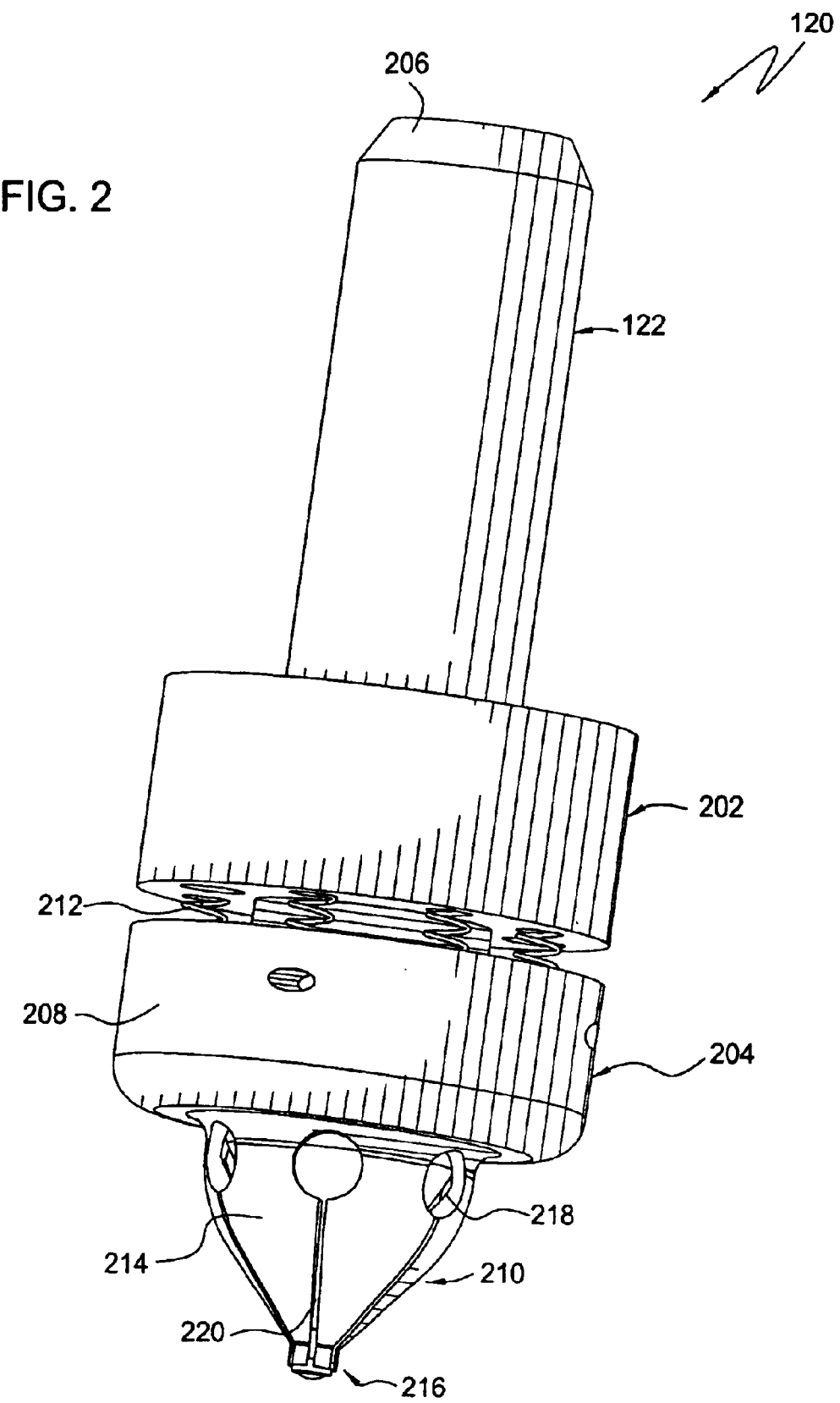
FIG. 2 is a perspective view of an exemplary optical component mounting apparatus.
Figure 3:
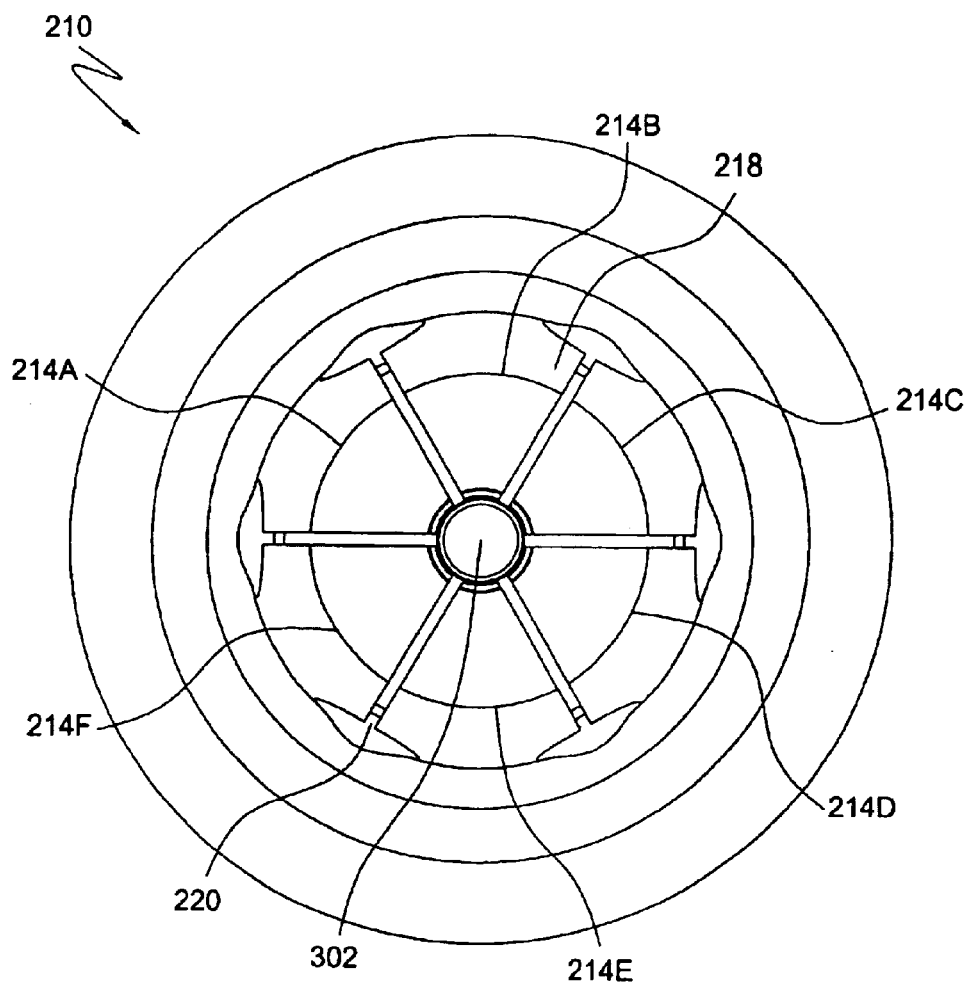
FIG. 3 is a bottom view of a sliding spring-biased lens retaining member.

Referring now to FIG. 2, a perspective view of the optical component mounting assembly 120 shown. In the illustrative embodiment, the optical component mounting assembly 120 is a generally cylindrical member comprising a body 122, an adjuster member housing 202 and a spring-biased lens retaining assembly 204. Generally, the body 122 includes a securing portion 206 which, as noted above, may be magnetic or include a magnetic portion. The adjuster member housing 202 is carried at about a midsection of the body 122, and may be integral therewith. In a neutral lens-carrying position (as shown), the adjuster member housing 202 maintains a spaced apart relationship with respect to the spring-biased lens retaining assembly 204. The spring-biased lens retaining assembly 204 generally comprises a base 208 and a lens carrying portion 210, which may be discrete or integrated components. The diametrical dimension of the base 208 is substantially equal to the adjuster member housing 202 to accommodate transversely disposed biasing members, illustratively shown as springs 212. In one embodiment, the optical component mounting assembly 120 includes six equally spaced six springs 212 having their respective ends disposed in the adjuster member housing 202 and the base 208. As will be discussed in more detail below, the springs 212 bias the lens retaining assembly 204 into a lens-carrying position. The lens carrying portion 210 generally includes a plurality of fingers 214 defining a contoured surface which tapers inwardly and which terminate at a lens carrying tip 216. As shown with brief reference to FIG. 3, the lens carrying portion 210 includes six fingers 214A-F. More generally, the lens carrying portion 210 may include any number of fingers 214. In any case, the lens carrying portion 210 defined by the fingers 214 forms an opening 302 sized to accommodate an optical component, i.e., a lens. In one embodiment, the fingers 214 may be flexible members capable of being deflected outwardly, thereby changing the diameter of the opening 302. In the illustrative embodiment, additional flexibility is achieved by the provision of holes 218 and slots 220 (which separate the various fingers 214).

Figure 4:
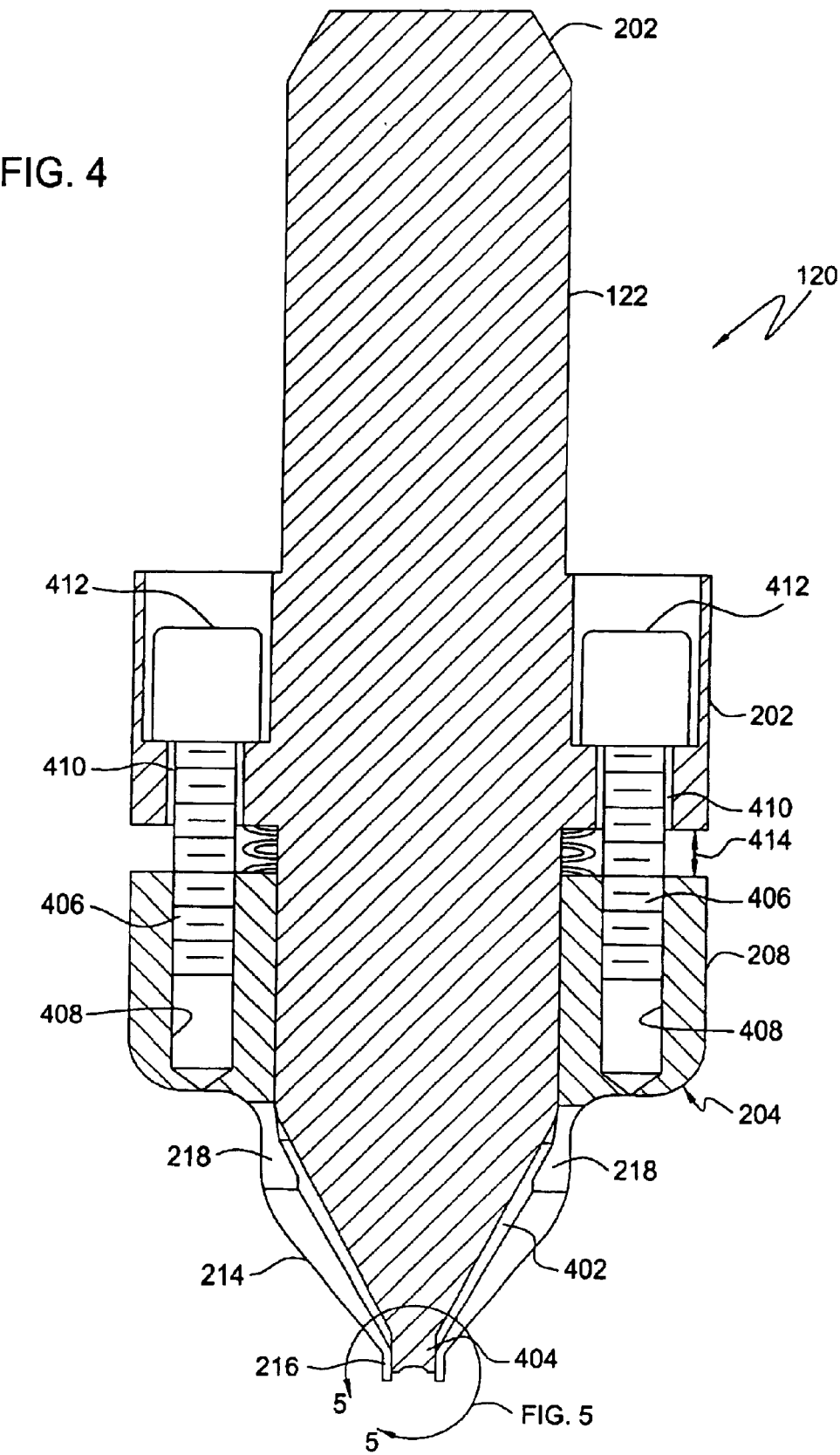
FIG. 4 is a side cross sectional view of the optical component mounting apparatus.
Figure 5:
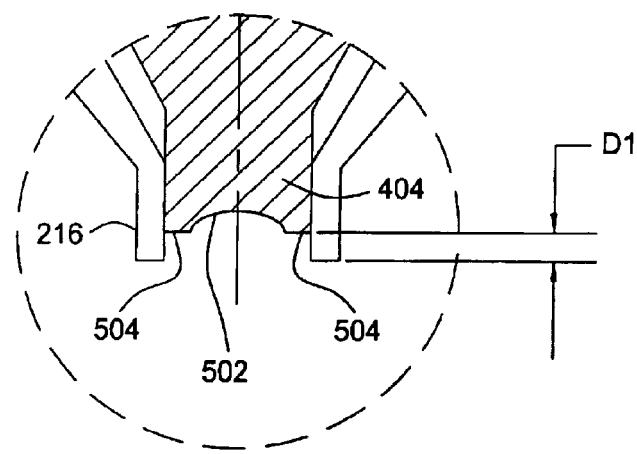
FIG. 5 is a side cross sectional view of a distal end of the optical component mounting apparatus in a lens carrying position.

Additional aspects of the invention may be described with reference to FIG. 4, which shows a cross-sectional view of the optical component mounting assembly 120. Illustratively, the body 122 is shown as a generally monolithic member which may be made of, for example, a ferromagnetic material. A lower end of the body 122 includes a tapered portion 402 terminating at a lens applicator tip 404. Referring briefly to FIG. 5, an enlarged view of the applicator tip 404 is shown (taken about section lines 5—5 of FIG. 4). Illustratively, a distal end of the applicator tip 404 includes a recessed surface 502 surrounded by a lens contact surface 504. The lens contact surface 504 may generally be defined by a variety of geometric shapes and contours. For example, in one embodiment, the lens contact surface 504 is a continuous annular surface; while in another embodiment, the lens contact surface 504 is defined by a plurality of discrete surfaces.

Referring again to FIG. 4, the spring-biased lens retaining assembly 204 is shown slidably disposed over the body 122. The range of sliding movement of the assembly 204 is delimited in at least one direction by one or more adjusting members 406. Illustratively, the adjusting members 406 are represented as screws threadedly disposed in counter-threaded bores 408 formed in the base 208 of the assembly 204. The screws 406 are slidably disposed through openings 410 formed in the adjuster member housing 202 and diametrically enlarged heads 412 disposed at the upper ends of the screws 406 prevent their travel through the openings 410.

Absent any counter-forces, the springs 212 bias the assembly 204 away from the adjuster member housing 202 until the heads 412 shoulder out against a surface of the adjuster member housing 202, thereby placing the optical component mounting assembly 120 in its neutral lens-carrying position. In this position, a gap 414 is formed between the adjuster member housing 202 and the assembly 204. Further, as can be best seen in FIG. 5, the lens carrying tip 216 (defined by the fingers 214) extends beyond the lens applicator tip 404 (distance D1). The distance D1 may be any distance sufficient to hold a lens and is adjustable by turning the screws 406.

Figure 6:
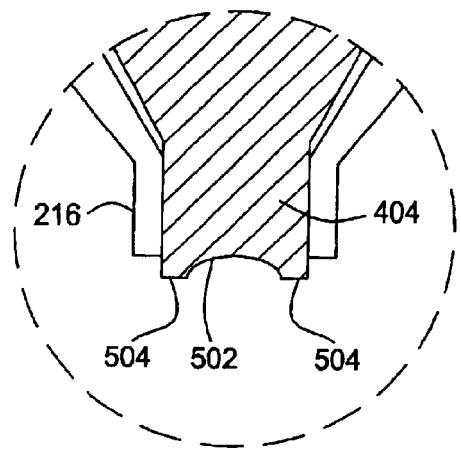
FIG. 6 is a side cross sectional view side cross sectional view of the optical component mounting apparatus in a lens release position.

When the base 208 is urged toward the adjuster member housing 202 (such as, for example, when the body 122 is moved downward while the spring-biased lens retaining assembly 204 is held in place), the gap 414 diminishes and the lens carrying tip 216 is retracted over the lens applicator tip 404. Continued movement in the manner places the optical component mounting assembly 120 in its "release position", illustrated in FIG. 6. Note that, in the illustrative embodiment, relative movement between the assembly 204 and the body 202 may continue until the base 208 and the adjuster member housing 202 contact one another. Depending upon the particular dimensions, this may cause the fingers 214 to ride up over the tapered surface 402 some distance.

Figure 7:
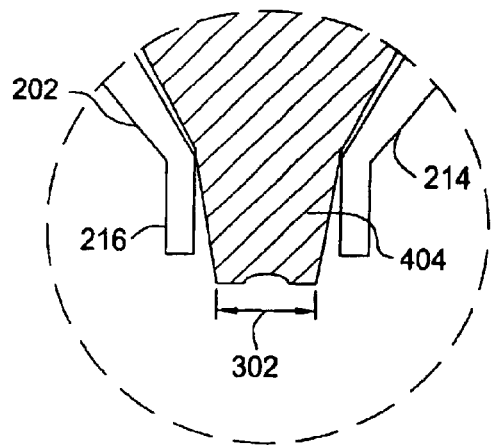
FIG. 7 is a side cross sectional view of another embodiment of the optical component mounting apparatus in a lens release position.

In a particular embodiment, the lens applicator tip 404 (or at least a portion thereof) may itself have a degree of outward taper. One such embodiment is shown in FIG. 7. In such an embodiment, the fingers 214 are caused to deflect outwardly as the lens carrying tip 216 is retracted over the lens applicator tip 404. In this manner, the opening 302 defined by the lens carrying tip 216 is widened, thereby facilitating release of an optical component being carried by the lens carrying tip 216. It should be understood that the taper shown in FIG. 7 is merely illustrative and not necessarily drawn to scale. Further, the geometry of the table may be varied according in different embodiments. For example, in one embodiment, the taper is exponential rather than linear, as shown.

Figure 8:
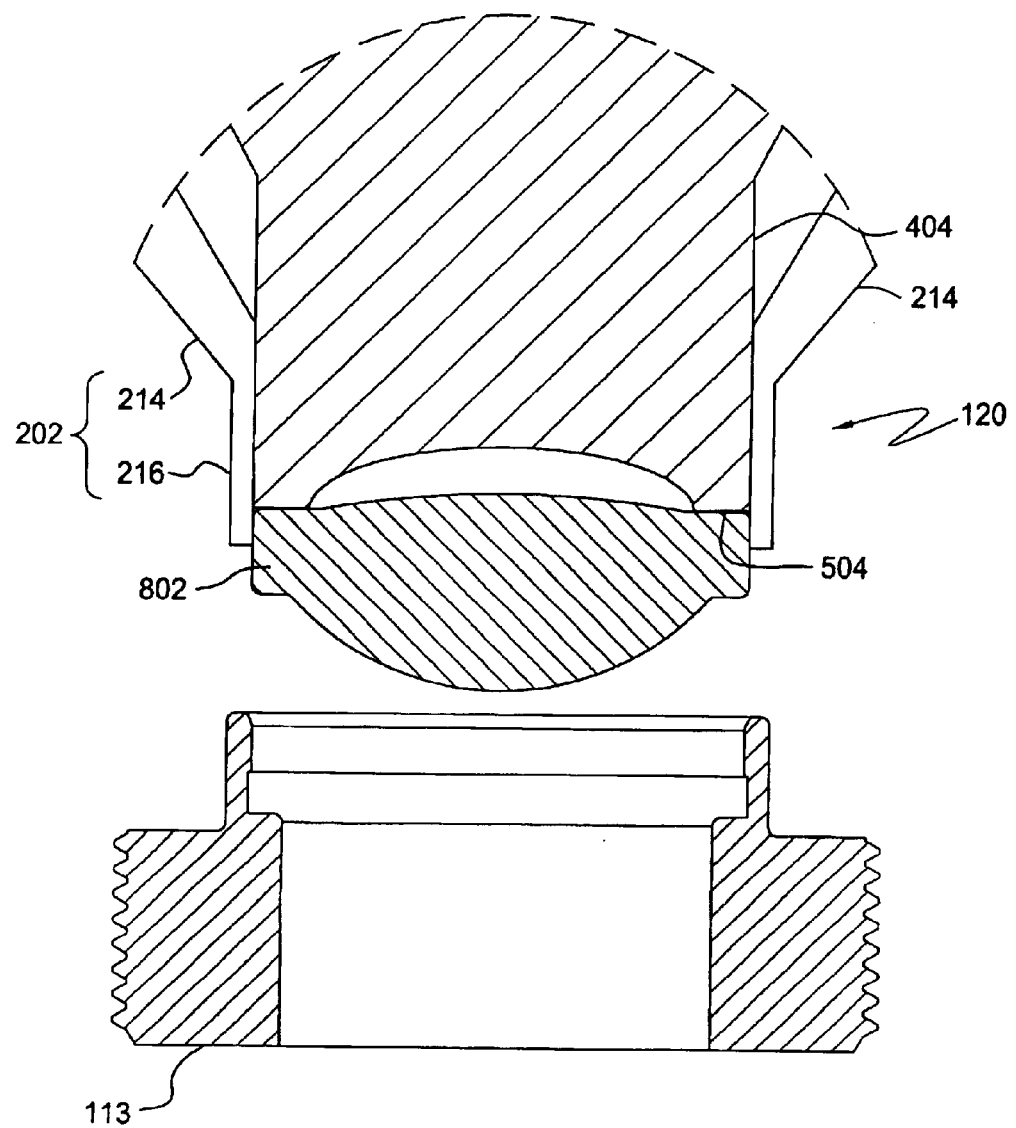
FIG. 8 is a side cross sectional view of the optical component mounting apparatus carrying a lens and positioned above a lens mount.
Figure 9:
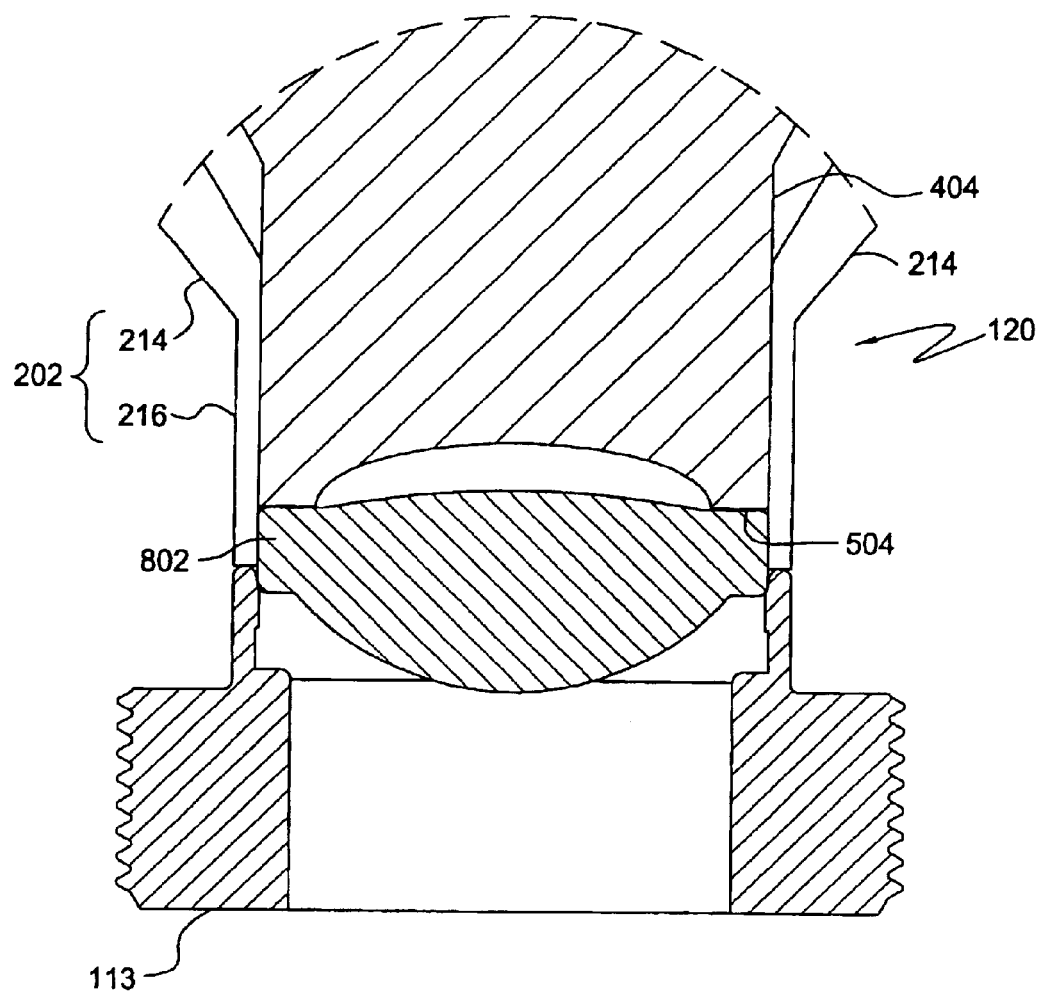
FIG. 9 is a side cross sectional view of the optical component mounting apparatus positioned in contact with the lens mount.
Figure 10:
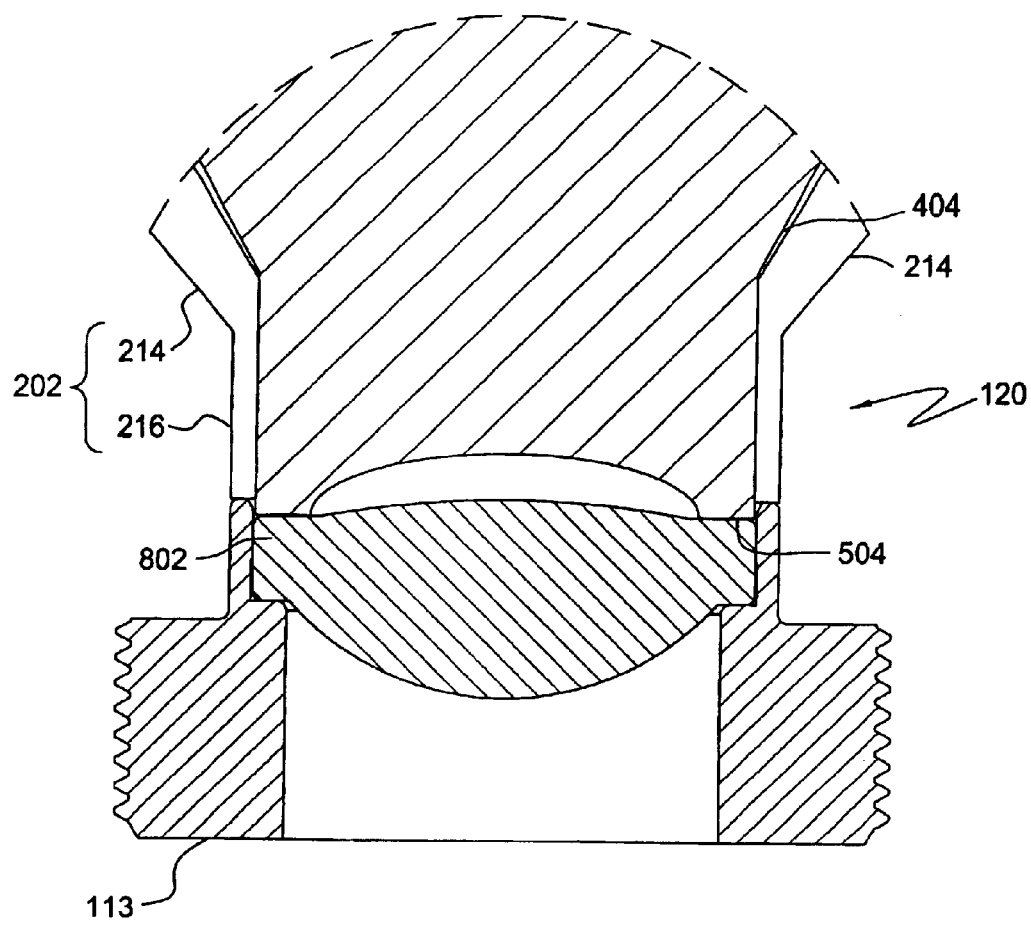
FIG. 10 is a side cross sectional view of the optical component mounting apparatus positioned in contact with the lens mount and in the lens release position.

Referring now to FIGS. 8–10, aspects of the operation of the optical component mounting assembly 120 are shown. FIG. 8 shows the assembly 120 disposed over a lens mount 113. The assembly 120 is carrying a lens 802 at its lower end. Specifically, the lens 802 is disposed on the lens contact surface 504 of the lens applicator 404, and is held in place by the lens carrying tip 216, which contacts the lens 802 at a perimeter surface. In one embodiment, the lens 802 is picked up by pressing the lens carrying tip 216 against the lens 802 (which may be of a greater diameter than the lens carrying tip 216) with sufficient force to urge the fingers 214 open. The lens then slides into the opening 302 and is maintained by an interference fit. The symmetric interface between the lens 802 and the lens carrying tip 216 ensure the lens 802 is square with respect to the tip 216. Consequently, symmetric engagement between the lens applicator tip 404 and the lens contact surface 504 is achieved. In this manner, pressure is distributed over the lens contact surface 504 rather than being localized, which could result in fracturing the lens.

Upon continued relative movement between the assembly 120 and the lens mount 113, the lens 802 is at least partially inserted into the lens mount 113, as shown by FIG. 9. Further, the lower surface of the lens carrying tip 216 is brought into contact with the upper surface of the lens mount 113. When a sufficient axial force is applied, the lens applicator tip 404 continues traveling towards the lens mount 113, while the spring-biased lens retaining assembly 202 is held in place by contact with the lens mount 113. Accordingly, the lens 802 is urged out of the lens carrying tip 216 and press fitted at a desired position in the lens mount 113 as determined by the terminal position of the lens applicator tip 404. An illustration of the optical component mounting assembly 120 in the terminal position is shown in FIG. 10. The assembly 120 may then be retracted away from the mount 113.

According to the foregoing technique, the lens 802 is maintained in a desired symmetric position throughout the mounting process. In one aspect, the optical component mounting assembly 120 provides for accurate mounting of an optical component without the use of epoxy or other affixing agents.

Some of the foregoing embodiments have been described with reference to relative terms such as above, below, over, under, downward, upward and the like. Such relative terms have been used merely for convenience and for purposes of illustration, and are not considered limiting of the claims.

While the foregoing is directed to embodiments of the invention, other and further embodiments of the invention may be devised without departing from the basic scope thereof, and the scope thereof is determined by the claims that follow.

What is claimed is:

1. An apparatus for mounting optical components, comprising:
    a body defining a lens applicator tip at one end, wherein the lens applicator tip defines a lens contact surface;
    a lens retaining member comprising a lens carrying tip defining a lens receiving opening and slidably disposed over at least the lens applicator tip; wherein the lens carrying tip is slidably positionable between a lens carrying position in which the lens carrying tip extends past the lens applicator tip, and a lens release position in which the lens carrying tip is retracted with respect to the lens applicator tip; and
    wherein the body comprises at least a magnetic portion.

2. The apparatus of claim 1, wherein the lens carrying tip defines a lens mount contact surface at a distal end thereof.

3. The apparatus of claim 1, wherein the lens contact surface is an annular surface disposed about a recess.

4. The apparatus of claim 1, wherein the lens retaining member comprises a plurality of fingers having the lens carrying tip disposed at a distal end thereof.

5. The apparatus of claim 1, further comprising an adjuster contacting at least the lens retaining member and adapted to set the lens carrying position.

6. The apparatus of claim 1, further comprising at least one biasing member contacting the body and the lens retaining member.

7. The apparatus of claim 1, further comprising at least one biasing member contacting the lens retaining member and biasing the lens retaining member in to the lens carrying position.

8. An apparatus for mounting optical components, comprising:
a body defining a lens applicator tip at one end, wherein the lens applicator tip defines a lens contact surface;
a slidably disposed lens retaining member comprising a plurality of flexible fingers which define a lens carrying tip slidably disposed over at least the lens applicator tip; wherein the lens carrying tip is slidably positionable between a lens carrying position and a lens release position; and
wherein, in the lens carrying position, the lens carrying tip extends past the lens applicator tip, and wherein, in the lens release position, the lens carrying tip is retracted with respect to the lens applicator tip.

9. The apparatus of claim 8, wherein the lens contact surface is an annular surface disposed about a recess.

10. The apparatus of claim 8, wherein the lens carrying tip defines a lens mount contact surface at a distal end thereof.

11. The apparatus of claim 8, further comprising at least one biasing member contacting the body and the lens retaining member.

12. The apparatus of claim 11, wherein the at least one biasing member biases the lens carrying tip into the lens carrying position.

13. An apparatus for mounting optical components, comprising:
a body defining a lens applicator tip at one end, wherein the lens applicator tip defines a lens contact surface;
a slidably disposed lens retaining member comprising a plurality of flexible fingers which define a lens carrying tip slidably disposed over at least the lens applicator tip; wherein the lens carrying tip defines a lens mount contact surface at a distal end thereof and is slidably positionable between a lens carrying position and a lens release position;
at least one biasing member to bias the lens retaining member into the lens carrying position; and
wherein the at least one biasing member comprises a plurality of springs.

14. The apparatus of claim 13, wherein the lens contact surface is an annular surface disposed about a recess.

15. The apparatus of claim 13, wherein, in the lens carrying position, the lens carrying tip extends past the lens applicator tip, and wherein, in the lens release position, the lens carrying tip is retracted with respect to the lens applicator tip.

16. The apparatus of claim 13, further comprising an adjuster contacting at least the lens retaining member and adapted to set the lens carrying position.

17. The apparatus of claim 16, further comprising an adjuster housing disposed on the body and having at least a portion of the adjuster disposed therein.

18. The apparatus of claim 17, wherein the at least one biasing member is at least partially disposed in the adjuster housing.

19. A method of mounting a lens in a lens mount, comprising:
disposing the lens against a lens contact surface of a lens applicator tip formed at a distal end of a body;
retaining the lens against the lens contact surface with a slidable lens carrying member disposed about a perimeter of the lens;
contacting a distal biasing surface of the slidable lens carrying member with an annular surface of the lens mount;
slidably retracting the slidable lens carrying member over the lens applicator tip, whereby the lens is released from the slidable lens carrying member while remaining in contact with the lens contact surface of the lens applicator tip; and
wherein the slidable lens carrying member comprises a plurality of flexible fingers and wherein the step of retaining comprises contacting the plurality of flexible fingers with the perimeter of the lens.

20. The method of claim 19, further comprising adjusting a distance a distal end of the slidable lens carrying member extends past the lens contact surface.

21. The method of claim 19, further comprising providing at least one biasing member to bias the slidable lens carrying member into a lens retaining position.

22. The method of claim 21, wherein slidably retracting the lens carrying member over the lens applicator tip comprises applying a sufficient force at an interface of the distal biasing surface and the annular surface to overcome a biasing force of the biasing member.

23. An apparatus for mounting optical components, comprising:
a body defining a lens applicator tip at one end, wherein the lens applicator tip defines a lens contact surface;
a lens retaining member comprising a lens carrying tip defining a lens receiving opening and slidably disposed over at least the lens applicator tip; wherein the lens carrying tip is slidably positionable between a lens carrying position in which the lens carrying tip extends past the lens applicator tip, and a lens release position in which the lens carrying tip is retracted with respect to the lens applicator tip; and
wherein the lens retaining member comprises a plurality of fingers having the lens carrying tip disposed at a distal end thereof.

24. An apparatus for mounting optical components, comprising:
a body defining a lens applicator tip at one end, wherein the lens applicator tip defines a lens contact surface;
a slidably disposed lens retaining member comprising a plurality of flexible fingers which define a lens carrying tip slidably disposed over at least the lens applicator tip; wherein the lens carrying tip defines a lens mount contact surface at a distal end thereof and is slidably positionable between a lens carrying position and a lens release position;
at least one biasing member to bias the lens retaining member into the lens carrying position; and
wherein, in the lens carrying position, the lens carrying tip extends past the lens applicator tip, and wherein, in the lens release position, the lens carrying tip is retracted with respect to the lens applicator tip.

25. An apparatus for mounting optical components, comprising:
a body defining a lens applicator tip at one end, wherein the lens applicator tip defines a lens contact surface;
a slidably disposed lens retaining member comprising a plurality of flexible fingers which define a lens carrying tip slidably disposed over at least the lens applicator tip; wherein the lens carrying tip defines a lens mount contact surface at a distal end thereof and is slidably positionable between a lens carrying position and a lens release position;

at least one biasing member to bias the lens retaining member into the lens carrying position;

further comprising an adjuster contacting at least the lens retaining member and adapted to set the lens carrying position; and further comprising an adjuster housing disposed on the body and having at least a portion of the adjuster disposed therein.

26. An apparatus for mounting optical components, comprising:

a body defining a lens applicator tip at one end, wherein the lens applicator tip defines a lens contact surface;

a slid ably disposed lens retaining member comprising a plurality of flexible fingers which define a lens carrying tip slidably disposed over at least the lens applicator tip; wherein the lens carrying tip defines a lens mount contact surface at a distal end thereof and is slidably positionable between a lens carrying position and a lens release position;

at least one biasing member to bias the lens retaining member into the lens carrying position;

further comprising an adjuster contacting at least the lens retaining member and adapted to set the lens carrying position;

further comprising an adjuster housing disposed on the body and having at least a portion of the adjuster disposed therein; and wherein the at least one biasing member is at least partially disposed in the adjuster housing.

* * * * *